(12) United States Patent
Akai et al.

(10) Patent No.: US 7,690,609 B2
(45) Date of Patent: Apr. 6, 2010

(54) SUCTION CUP

(75) Inventors: Takayuki Akai, Chiba (JP); Makoto Kawabata, Tokyo (JP)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 11/733,953

(22) Filed: Apr. 11, 2007

(65) Prior Publication Data
US 2007/0246621 A1    Oct. 25, 2007

(30) Foreign Application Priority Data
Apr. 20, 2006    (JP)    ............................. 2006-116359

(51) Int. Cl.
A45D 42/14    (2006.01)

(52) U.S. Cl. .............. 248/205.5; 248/205.7; 248/205.8; 248/206.1; 248/206.2; 248/363; 248/467

(58) Field of Classification Search .............. 248/205.5, 248/205.7, 205.8, 206.1, 206.2, 363, 467
See application file for complete search history.

(56) References Cited

U.S. PATENT DOCUMENTS

| | | | | |
|---|---|---|---|---|
| 1,847,403 A | * | 3/1932 | Loughman | ................... 40/597 |
| 2,557,434 A | * | 6/1951 | Hoverder | ..................... 248/544 |
| 3,180,604 A | * | 4/1965 | Hammer | ................... 248/205.8 |
| 3,310,267 A | * | 3/1967 | Koehler | ..................... 248/176.1 |
| 3,833,230 A | | 9/1974 | Noll | |
| 4,421,288 A | * | 12/1983 | Blaszkowski | ............. 248/205.4 |
| 4,822,656 A | * | 4/1989 | Hutter, III | .................. 428/41.8 |
| 5,318,262 A | | 6/1994 | Adams | |
| 5,631,426 A | * | 5/1997 | Jao | ............................. 73/644 |
| 5,964,437 A | * | 10/1999 | Belokin et al. | ........... 248/205.5 |
| 6,143,391 A | * | 11/2000 | Barnes et al. | ................. 428/99 |
| 6,234,435 B1 | * | 5/2001 | Yeh | .......................... 248/205.5 |
| 6,405,983 B1 | * | 6/2002 | Goj | .......................... 248/205.1 |
| 6,733,438 B1 | * | 5/2004 | Dann et al. | .................... 600/38 |
| 2007/0102847 A1 | * | 5/2007 | Ilda et al. | ................. 264/328.1 |

FOREIGN PATENT DOCUMENTS

| | | |
|---|---|---|
| JP | 59-166015 | 11/1984 |
| JP | 6-59621 | 8/1994 |
| JP | 6-84018 | 12/1994 |
| JP | 8-326736 | 12/1996 |
| JP | 11-230149 | 8/1999 |
| JP | 3053372 | 4/2000 |
| JP | 3098169 | 8/2000 |

OTHER PUBLICATIONS

U.S. Appl. No. 12/042,796, filed Mar. 5, 2008, Kawabata.

* cited by examiner

*Primary Examiner*—J. Allen Shriver, II
*Assistant Examiner*—Michael McDuffie
(74) *Attorney, Agent, or Firm*—Oblon, Spivak, McClelland, Maier & Neustadt, L.L.P.

(57) ABSTRACT

A suction cup having an adsorption surface is provided wherein the suction cup has a disk-like main suction cup unit composed of an elastically-deformable material and has an attachment surface. The attachment surface has a gel layer composed of a gel, bonded thereto so as to cover the attachment surface. The adsorption surface is formed by the surface of the gel layer, and the gel layer are composed of a center portion composing the center of the adsorption surface, and a circumferential portion composing the outer circumference of the adsorption surface. The outer circumferential portion has the thickness larger than the thickness of the center portion.

19 Claims, 7 Drawing Sheets

SUCTION CUP

BACKGROUND OF THE INVENTION

1. Field of the Invention

The present invention relates to a suction cup.

2. Description of the Related Art

Suction cup is used for the purpose of attaching various objects to surfaces to be adsorbed.

If the surface to be adsorbed is such as having fine irregularity or roughness, typically as found in dashboards of automobiles, any effort of allowing the adsorption surface of the suction cup to adsorb the surface to be adsorbed fails in keeping adhesiveness between the adsorption surface and the surface to be adsorbed, resulting in formation of a gap between the adsorption surface and the surface to be adsorbed. As a consequence, air comes through the gap to reach the adsorption surface, making it difficult to ensure the adhesiveness by the suction cup.

There has been proposed a suction cup, having a main suction cup unit formed using a hard material such as hard rubber or hard synthetic resin, and a soft material such as soft rubber or soft synthetic resin, as being disposed by polymerization on the inner circumferential surface thereof, allowing use of the soft material as the adsorption surface (see Japanese Utility Model Application Publication No. S59-166015).

Even the suction cup using the above-described soft material, however, cannot keep close adhesiveness between the adsorption surface and the surface to be adsorbed, if the surface to be adsorbed has an irregular surface or roughened surface, placing a limit of ensuring adhesiveness of the suction cup.

The present invention was conceived after considering the above-described situation, and an object thereof resides in providing a suction cup advantageous in terms of ensuring the adhesiveness while reducing the cost, even when the surface to be adsorbed has fine irregularity or roughened surface, without degrading the desirable appearance.

SUMMARY OF THE INVENTION

The present invention aimed at accomplishing the above-described object relates to a suction cup having an adsorption surface; the suction cup having a disk-like main suction cup unit composed of an elastically-deformable material and having an attachment surface, the attachment surface having a gel layer composed of a gel, bonded thereto so as to cover the attachment surface, the adsorption surface being formed by the surface of the gel layer, and the gel layer being composed of a center portion composing the center of the adsorption surface, and a circumferential portion composing the outer circumference of the adsorption surface, wherein the outer circumferential portion has the thickness larger than the thickness of the center portion.

The gel layer in the present invention is formed as being thickened in the outer circumferential portion than in the center portion, so that when the adsorption surface is allowed to adsorb onto the surface to be adsorbed, the hardness of the gel layer in the outer circumferential portion can be kept at a low level, typically at a level equivalent to that of the gel layer in the center portion, even if the gel layer in the outer circumferential portion is stretched to a larger degree as compared with the gel layer in the center portion, and is consequently thinned, and thereby the adhesiveness between the adsorption surface and the surface to be adsorbed can be ensured.

As a consequence, it is made possible to ensure adhesiveness of the adsorption surface of the suction cup to the surface to be adsorbed, by minimizing the thickness of the gel layer, and by using a minimum amount of gel.

BRIEF DESCRIPTION OF THE DRAWINGS

The present invention will become more readily appreciated and understood from the following detailed description of embodiments and examples of the present invention when taken in conjunction with the accompanying drawings, in which.

DESCRIPTION OF THE INVENTION

Embodiments of the present invention will be explained referring to the attached drawings.

Paragraphs below will explain a case where a display of a car navigation system as a car-borne instrument is attached to a dashboard, front panel and so forth, with the aid of the suction cup device 20 using the suction cup of the present invention.

Figure 1:
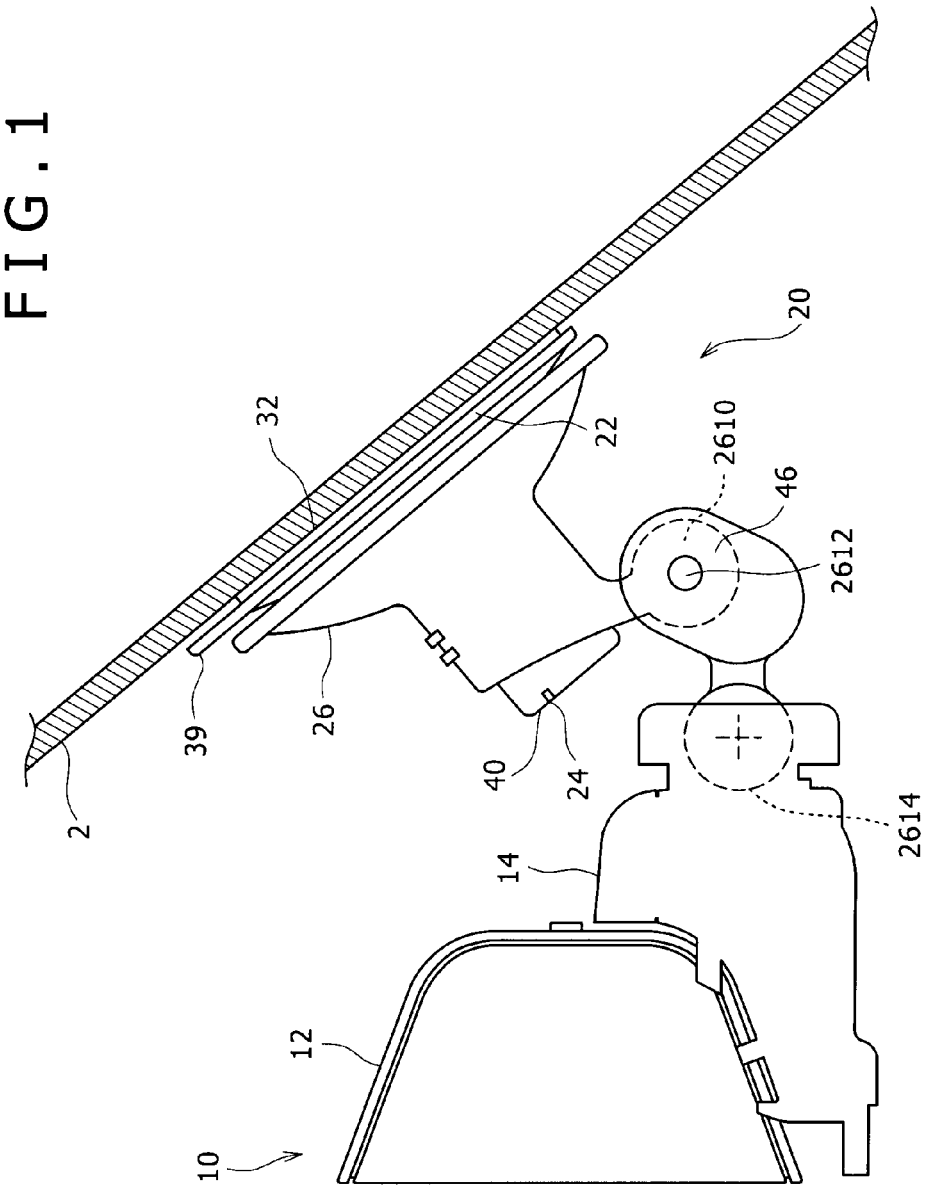
FIG. 1 is a side elevation of a state of attachment of a display of a car navigation system to a dashboard or a front glass panel, with the aid of a suction cup device using a suction cup according to one embodiment of the present invention.
Figure 2:
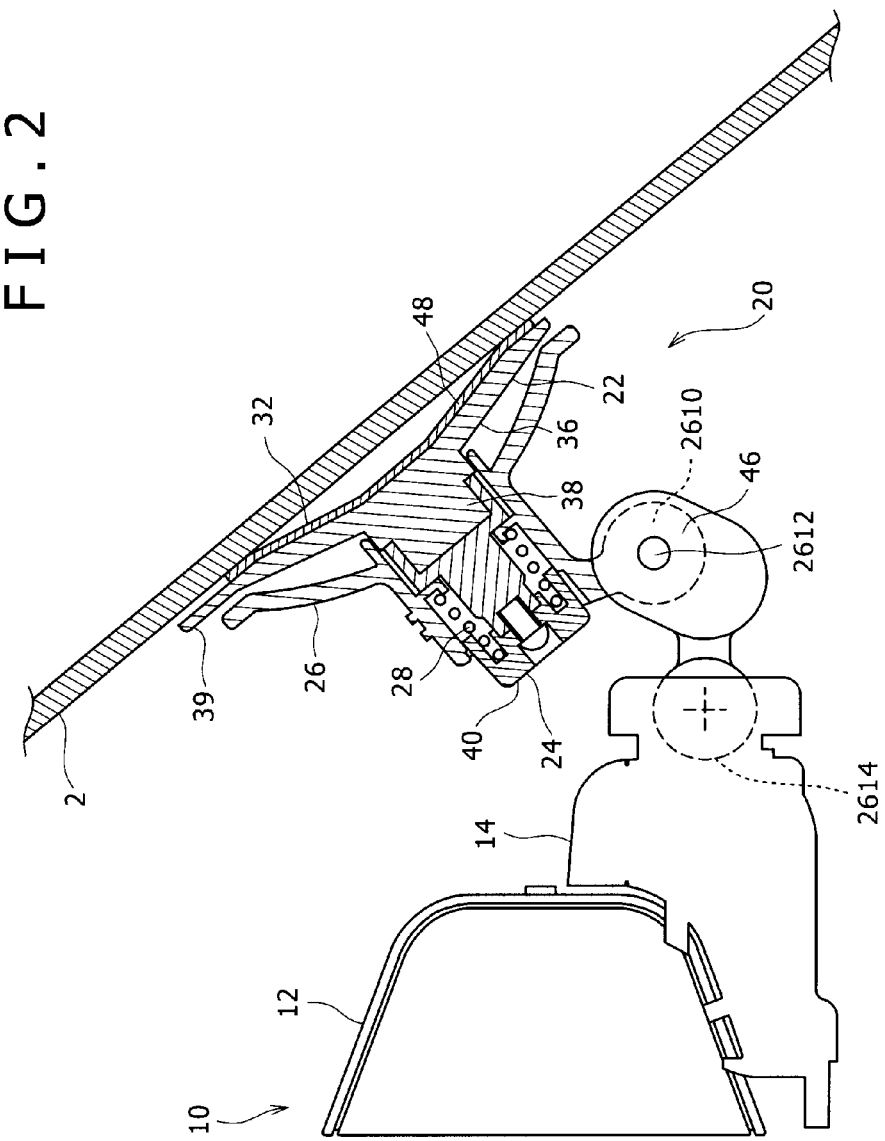
FIG. 2 is a sectional view of FIG. 1.

FIG. 1 is a side elevation of a state of attachment of a display of a car navigation system to a dashboard or a front glass panel, with the aid of the suction cup device 20, and FIG. 2 is a sectional view of FIG. 1.

As shown in FIGS. 1 and 2, a holder 14 is provided on the back surface of a frame 12 of a display 10 of a car navigation system as being projected out therefrom, a suction cup device 20 is provided behind the holder 14, and the suction cup device 20 is attached to the surface to be adsorbed 2, such as a dashboard, front glass panel or the like.

The surface to be adsorbed 2, given as the dashboard, is inclined towards the vehicle cabin rather than kept horizontally, formed by a gently curved surface, having the surface of which formed as a leather-like creped surface composed of a fine irregularity surface or a roughened surface, whereas for the case of front glass panel, it is formed by a smooth curved surface.

Figure 3:
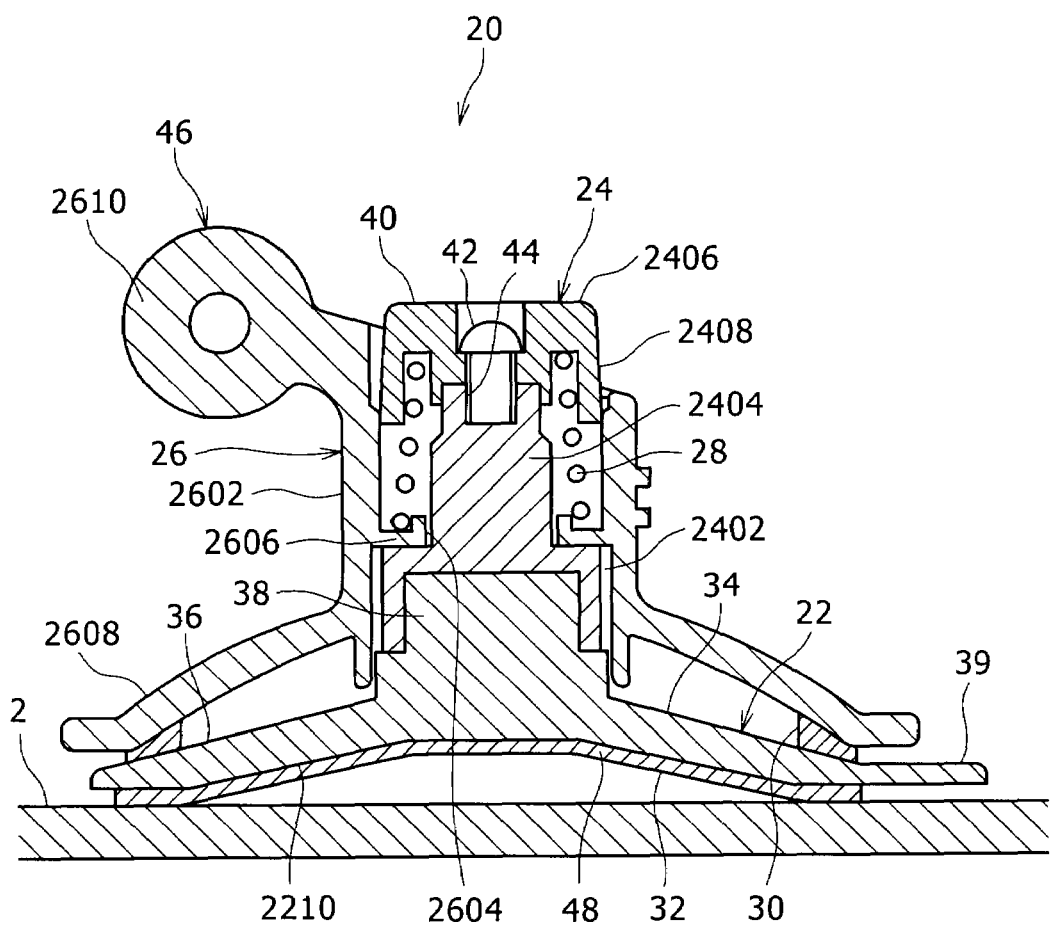
FIG. 3 is a drawing explaining a state of a suction cup device 20 before being adsorbed onto a surface to be adsorbed 2.
Figure 4:
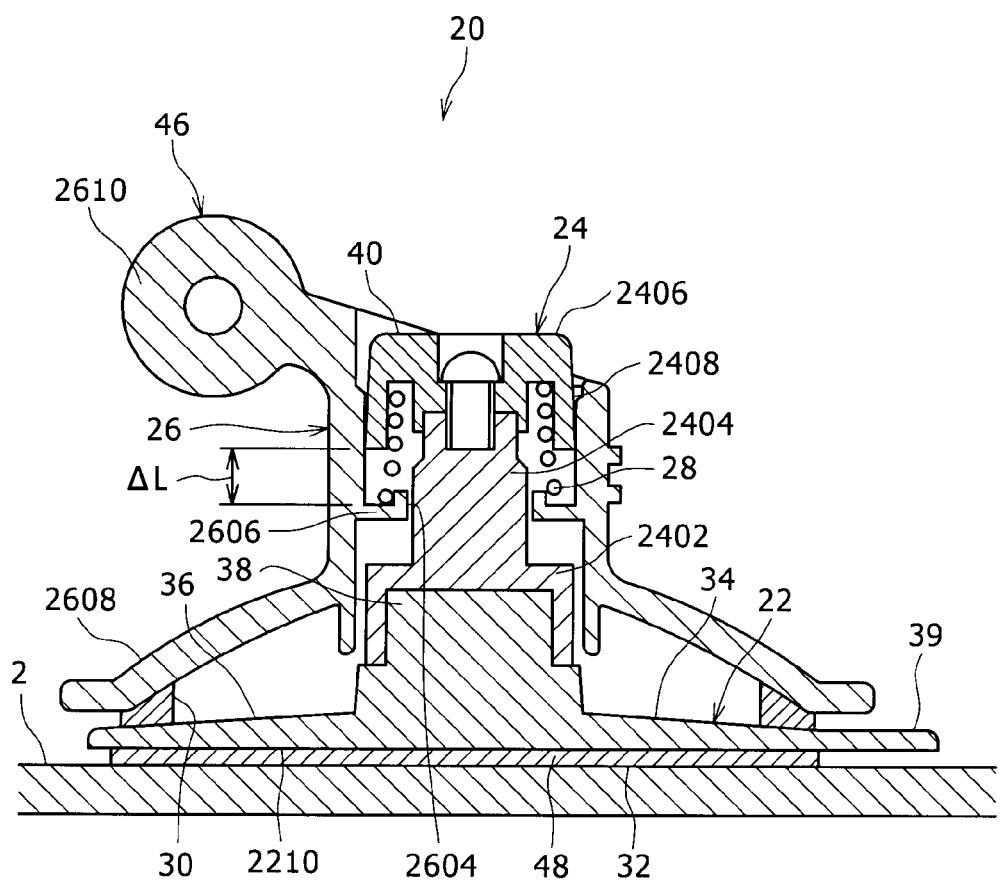
FIG. 4 is a drawing explaining a state of attachment of the suction cup device 20 to the surface to be adsorbed 2.
Figure 5:
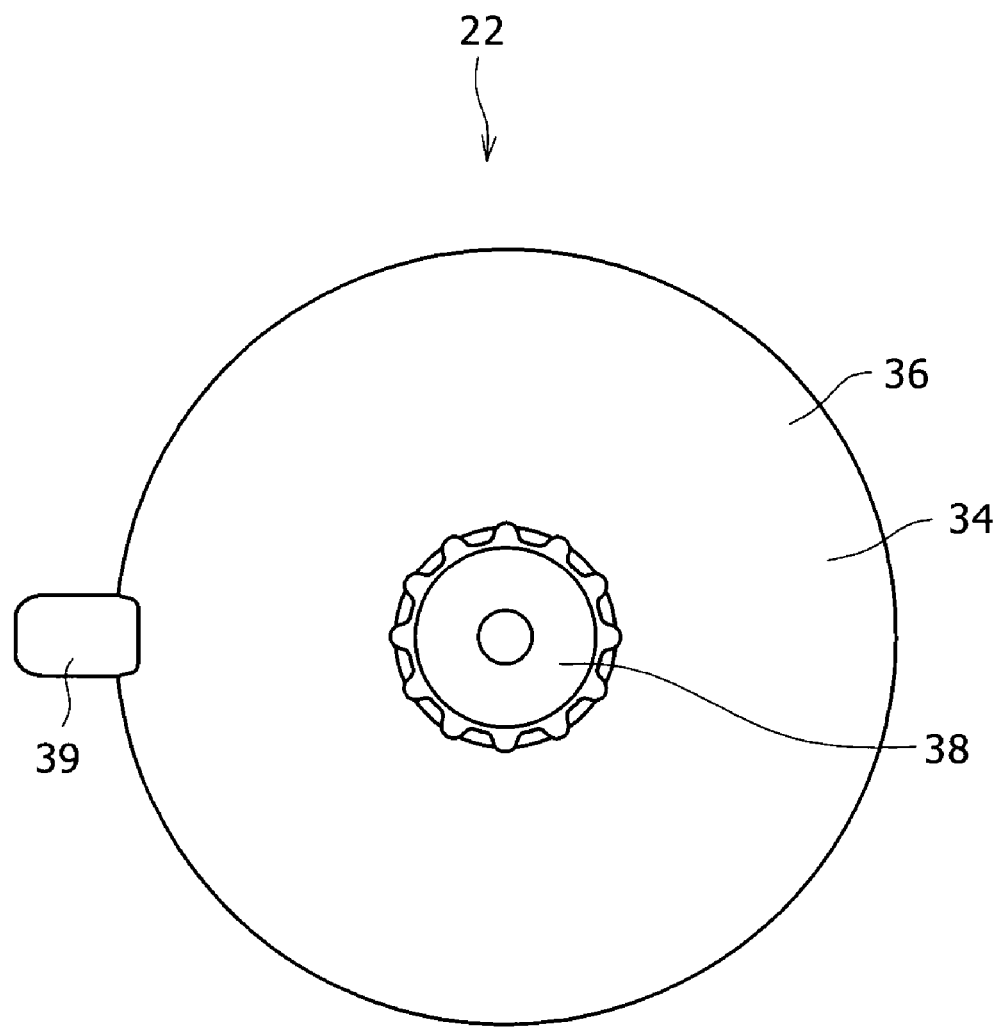
FIG. 5 is a plan view of a suction cup 22.
Figure 6:
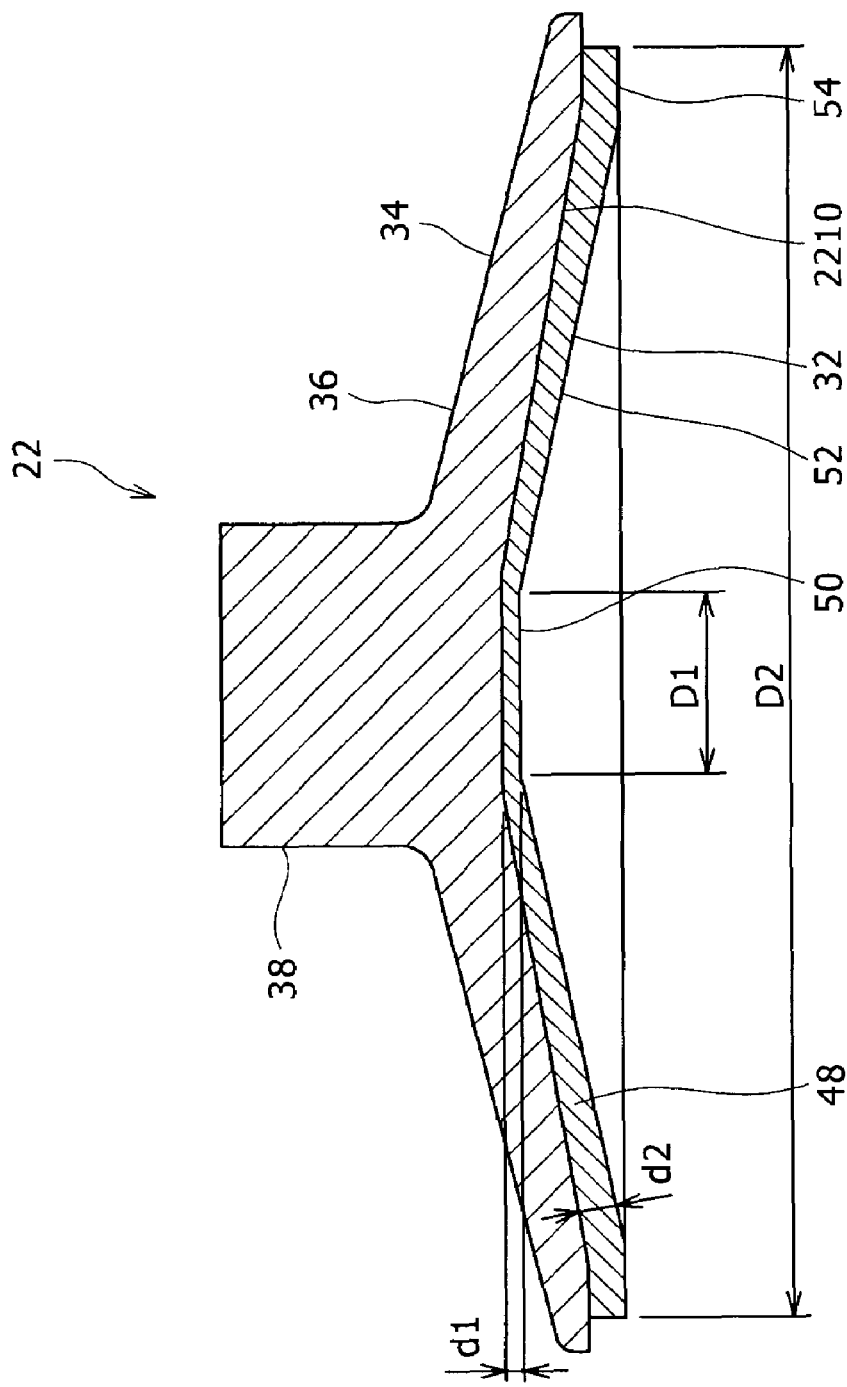
FIG. 6 is a sectional view of the suction cup 22.

FIG. 3 is a drawing explaining a state of the suction cup device 20 before being adsorbed onto the surface to be adsorbed 2, FIG. 4 is a drawing explaining a state of attachment of the suction cup device 20 to the surface to be adsorbed 2, FIG. 5 is a plan view of a suction cup 22, and FIG. 6 is a sectional view of the suction cup 22.

The suction cup device 20 is configured as including the suction cup of the present invention, a shaft component 24, a frame 26, an elastic component 28 and a cushion material 30.

As shown in FIGS. 3 and 5, the suction cup 22 has the adsorption surface 32 formed on one surface in the thicknesswise direction, whereas the opposite surface in the thicknesswise direction is given as a back surface 34.

As shown in FIG. 3, the shaft component 24 is coupled to the center of the back surface 34 of the suction cup 22, as being projected out from the center of the back surface 34.

The shaft component 24 includes a base 2402 coupled to the center of the back surface 34 of the suction cup 22, a shaft 2404 smaller in the diameter than the base 2402 and projected out from the base 2402, an end wall portion 2406 formed at the end of the shaft 2404 with the outer diameter larger than the shaft 2404, and an inner cylinder 2408 provided so as to droop down from the outer circumference of the end wall portion 2406 and so as to oppose to the shaft portion closer to the end wall portion 2406.

The end wall portion 2406 and the inner cylinder 2408 are formed as being integrated with each other, thereby a cap 40 is configured by the end wall portion 2406 and the inner cylinder 2408, and the cap 40 is attached as being freely detachable by aid of a screw 42 and a screw hole 44.

The shaft component 24 is typically composed of a synthetic resin.

The frame 26 is coupled to the shaft component 24 so as to freely movable in the longitudinal direction of the shaft component 24, and has an attachment component 46 used for attaching objects.

The frame 26 has an outer cylinder 2602 coupled to the outer circumferential surface of the inner cylinder 2408 as being freely movable in the axial direction of the inner cylinder 2408, an annular flange 2606 provided as being projected out from the inner circumferential surface of the outer cylinder 2602 50 as to oppose to the shaft 2404 portion between the base 2402 and the inner cylinder 2408, and having, as being formed at the center thereof, a hole 2604 having the inner diameter larger than the outer diameter of the shaft 2404 and smaller than the inner circumferential surface of the inner cylinder 2408, an annular plate 2608 spreading out from one end in the longitudinal direction of the outer cylinder 2602 so as to cover the back surface 34 of the main suction cup unit 36, and a fitting tab 2610 provided as being projected out from the other end in the longitudinal direction of the outer cylinder 2602. In this embodiment, the attachment component 46 is configured by the fitting tab 2610.

The frame 26 is typically composed of a synthetic resin.

As shown in FIG. 1, the holder 14 and the frame 26 are coupled as being freely rotatable and adjustable around a shaft 2612 inserted in the fitting tab 2610. The portion of the holder 14 supporting the display, and the portion coupled with the fitting tab 2610 are coupled as being freely rotatable and swingable with the aid of a ball joint 2614. Therefore in this embodiment, an object attached to the attachment component 46 is the display 10 of the car navigation system.

As shown in FIG. 3, the elastic component 28 is provided between the shaft component 24 and the frame 26, so as to energize the frame 26 towards the adsorption surface 32.

The elastic component 28 in this embodiment is formed by a coil spring. It is to be noted herein that the elastic component 28 may be anything provided that they can energize the frame 26 towards the adsorption surface 32, allowing use of rubber, solid damper and the like.

The elastic component 28 is provided outside the shaft 2404 and inside the inner cylinder 2408, as being extended between the end wall portion 2406 and the flange 2606.

As shown in FIG. 3, the cushion material 30 is provided to the frame 26, brought into contact with the back surface 34 of the suction cup 22 or the surface to be adsorbed 2 to which the adsorption surface 32 adsorbs, thereby allowing positioning of the frame 26 in the approaching or departing direction to or from the surface to be adsorbed 2.

The cushion material 30 is provided as being extended in an annular band form on the surface of the annular plate 2608 opposed to the back surface 34 of the suction cup 22, and as being brought into contact with the portion closer to the outer circumference on the back surface 34 of the suction cup 22.

The cushion material 30 is composed of an elastic material capable of absorbing shocks. Urethane foam is an applicable example of such material, and is, for example, commercially available under the trade name of "PORON" from Inoac Corporation.

Paragraphs below will explain adsorption of the suction cup device 20 to the surface to be adsorbed 2.

First, as shown in FIG. 3, the adsorption surface 32 of the suction cup 22 of the suction cup device 20 is opposed to the surface to be adsorbed 2, and the outer circumferential portion of the adsorption surface 32 is pressed to the surface to be adsorbed 2. In this state, a space with the confined air is formed between the adsorption surface 32 and the surface to be adsorbed 2.

Next, when the end wall portion 2406 of the shaft component 24 is pressed towards the direction of the adsorption surface 2, the center portion of the suction cup 22 deforms so as to approach the surface to be adsorbed 2 as shown in FIG. 4, the entire portion of the adsorption surface 32 is brought into close contact with the surface to be adsorbed 2, the air confined in the space is discharged out from the gap between the adsorption surface 32 and the surface to be adsorbed 2, thereby the space between the adsorption surface 32 and the surface to be adsorbed 2 becomes almost vacuum, allowing the suction cup 22 to adhere to the surface to be adsorbed 2, and thereby the suction cup device 20 is attached to the surface to be adsorbed 2.

In this process, the frame 26 is positioned in the direction of approaching or departing to or from the surface to be adsorbed 2, when the annular plate 2608 of the frame 26 energized by the elastic component 28 towards the surface to be adsorbed 2 is brought into contact with the cushion material 30, wherein in this state, the flange 2604 of the frame 26 and the inner cylinder 2408 of the shaft component 24 is kept apart by a distance of ΔL. In other words, a margin expressed by the distance ΔL can be ensured, even if the frame 26 and the shaft component 24 should cause displacement in the approaching direction due to vibration and impact.

The suction cup device 20 configured as described in the above raises advantages as described below.

By virtue of attachment of the suction cup device 20 to the surface to be adsorbed 2, any vibration and impact of vehicles transmitted to the surface to be adsorbed 2 are transmitted to the holder 14 and the display 10, by a first route including the suction cup 22, the shaft component 24, the elastic component 28, the frame 26 and the attachment component 46, and also transmitted to the holder 14 and the display 10, by a second route including the suction cup 22, the cushion material 30, the frame 26 and the attachment component 46.

In this process, the vibration and impact are absorbed and moderated by the elastic component 28 and the cushion material 30 in either of these routes, so that vibration and impact of vehicles transmitted to the display 10 can effectively be suppressed.

Suppression of vibration and impact on the display 10 is advantageous in terms of improving the durability of the display 10, and suppression of fluctuation on the screen makes the display 10 more recognizable and makes the car navigation system more convenient to use.

For the display 10 having touch-panel switches, suppression of the fluctuation on the screen is advantageous in terms of ensuring operability of the switches.

In particular for the case where an object attached to the suction cup device 20 is an electronic instrument using sophisticated electronic components such as the display 10 described in the embodiment, the configuration is advantageous in terms of suppressing degradation of the service life of the electronic components.

In the suction cup device 20 shown in FIG. 4, the portion of the back surface 34 of the suction cup 22, closer to the outer circumference thereof, is energized towards the surface to be adsorbed 2, by allowing the cushion material 30 to contact with the portion closer to the outer circumference. For the case where the surface to be adsorbed 2 has a gently curved surface, the portion of the back surface 34 of the suction cup 22, closer to the outer circumference thereof, is pressed conforming to the curved surface of the surface to be adsorbed 2, so that the configuration is advantageous in terms of improving adhesiveness of the adsorption surface 32 to the surface to be adsorbed 2.

It is therefore made possible to exactly allow the suction cup 22 to adsorb onto the surface to be adsorbed 2 having a gentle curve, making it advantageous in terms of exactly attaching an object such as the display 10 supported by the suction cup device 20 to the surface to be adsorbed 2.

Next the suction cup 22 will be detailed.

As shown in FIGS. 3 and 5, the suction cup 22 has a disk-like main suction cup unit 36 having the absorption surface 32 formed thereon, the suction cup shaft 38 is provided as being projected out from the center of the back surface 34 of the main suction cup unit 36, and the base 2402 of the shaft component 24 is coupled to the suction cup shaft 38.

A tab 39 for the convenience of detaching is provided to the outer rim of the main suction cup unit 36 as being projected out therefrom.

For the main suction cup unit 36, various conventionally-known materials having been used for conventional suction cups such as elastic synthetic resins, and more specifically those of urethane-base, styrene-base, silicone-base and the like, are applicable.

In this embodiment, as shown in FIG. 3, a concave attachment surface 2210 is formed on the surface of the suction cup 22 opposite to the back surface 34, the gel layer 48 composed of a gel is bonded to the attachment surface 2210 so as to cover the attachment surface 2210, and the adsorption surface 32 is formed in a concave geometry on the surface of the gel layer 48.

As this sort of gel, those of synthetic resin base, such as those of polyethylene-base, styrene-base, silicone-base and the like are applicable. The polyethylene-base gel is commercially available, for example, under the trade name of Cosmogel from Cosmo Instruments Co., Ltd. The styrene-base gel is commercially available, for example, under the trade name of "NEGAFLEX" from Inoac Corporation. The silicone-base gel is commercially available, for example, under the trade name of αGEL from Geltech Co., Ltd.

Double molding, bonding using an adhesive, and other methods are adoptable to the bonding of the gel layer 48 to the attachment surface 2210.

As shown in FIG. 6, the gel layer 48 of the suction cup 22 is formed so that the outer circumferential portion 54 composing the outer circumference of the adsorption surface 32 is thicker than the center portion 50 composing the center of the adsorption surface 32.

The center portion 50 is formed as having a uniform thickness, and also the outer circumferential portion 54 is formed as having a uniform thickness. The uniform thickness referred to as herein means a nearly uniform thickness including a more or less variation ascribable to errors in molding or accuracy error, and is substantially uniform thickness.

In this embodiment, the center portion 50 and the outer circumferential portion 54 are connected with an annular-plate-like slope 52 structurally continued from the outer circumference of the center portion 50, and having the thickness gradually increased towards the outer circumferential portion 54.

The center portion 50 is formed as having the same thickness with the inner circumferential portion of the slope 52, and the outer circumferential portion 54 is formed as having the same thickness with the outer circumferential portion of the slope 52.

In this example, diameter D1 of the center portion 50 is 10 mm, diameter D2 of the outer circumferential portion 54 is 70 mm, thickness d1 of the gel layer 48 in the center portion 50 is 1 mm, and thickness d2 of the gel layer 48 in the outer circumferential portion 54 is 2 mm.

Because the adsorption surface 32 of the suction cup 22 is formed using the gel layer 48, the suction cup 22 is advantageous in that the adsorption surface 32 can deform conforming to irregularity even when the surface to be adsorbed 2 is formed as a leather-like creped surface, and given as an irregularity surface or a roughened surface, that the adsorption surface 32 can be brought into close contact with irregular surfaces or roughened surfaces while leaving no gap between itself and the irregularity surface, that the suction cup 22 can exactly be adhered onto irregular surfaces and roughened surfaces, and that objects such as the display 10 can exactly be attached to the surface to be adsorbed 2 having a leather-like creped surface such as on the dashboard panel, and also raises the effects below.

Figure 7:
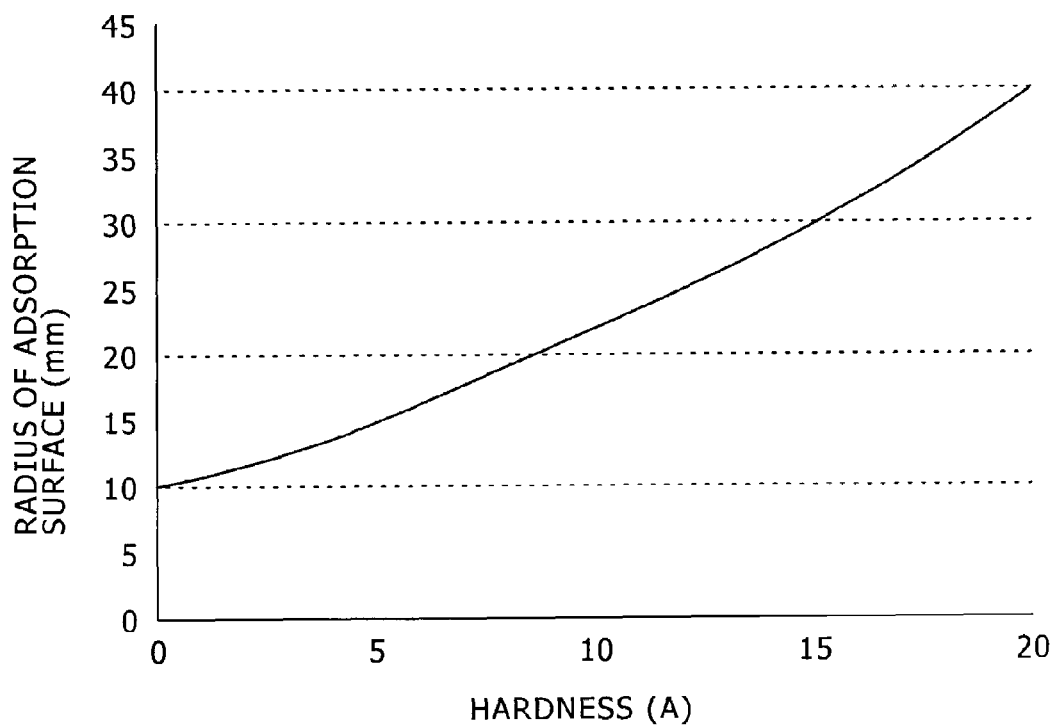
FIG. 7 is a hardness distribution chart in the radial direction of the adsorption surface 32, in a state of allowing the suction cup 22 having a gel layer 48 of a uniform thickness to adsorb on to the surface to be adsorbed.

FIG. 7 shows hardness distribution in the radial direction of the adsorption surface 32, in a state of allowing the suction cup 22 having a gel layer 48 of a uniform thickness to adsorb on to the surface to be adsorbed. When the adsorption surface 32 is brought into close contact with the surface to be adsorbed 2, the gel layer 48 is more largely stretched as viewed towards the outer circumference thereof, reduced in the thickness as viewed towards the outer circumference thereof, and consequently raised in the hardness of the gel layer 48 as viewed towards the outer circumference as shown in FIG. 7, and reduced in the adhesiveness of the adsorption surface 32 to the surface to be adsorbed 2.

When an object such as the display 10 is attached to the suction cup device 20 to the surface to be adsorbed 2, a large and uniform thickness of the gel layer 48 aimed at ensuring the adhesiveness increases the thickness of the adsorption surface 32 of the suction cup 22, makes the suction cup device 20 less nice-looking, and is disadvantageous in the cost reduction because a large amount of gel is necessary.

In contrast in this embodiment, the gel layer 48 is formed as having a larger thickness in the outer circumferential portion 54 than in the center portion 50, so that when the adsorption surface 32 is allowed to adhere onto the surface to be adsorbed 2, the hardness of the gel layer 48 in the outer circumferential portion 54 is kept at a low level, and typically kept at a level equivalent to that of the gel layer 48 in the center portion 50, even if the gel layer 48 is stretched larger in the outer circumferential portion 54 than in the center portion 50, and is consequently reduced in the thickness.

It is therefore made possible to ensure adhesiveness of the adsorption surface 32 of the suction cup 22 to the surface to be adsorbed 2, by minimizing the thickness of the gel layer, and by using a minimum amount of gel, while minimizing the thickness of the adsorption surface 32 of the suction cup 22, and using a minimum amount of gel, and so that it is made possible to ensure adhesiveness of the adsorption surface 32 without impairing the excellent appearance of the suction cup device 20, while reducing the cost.

In particular in this embodiment, the center portion 50 and the outer circumferential portion 54 are connected with the annular-plate-like slope 52 gradually thickened towards the outer circumferential portion 54, so that also decrease in the hardness of the gel layer 48 on the slope 52 is effectively prevented, and also decrease in the adhesiveness to the surface to be absorbed 2 ascribable to the gel layer 48 on the slope 52 can be prevented, raising a larger advantage in ensuring the adhesiveness of the adsorption surface 32 of the suction cup 22 to the surface to be absorbed 2.

Next, results of comparative experiment of adhesiveness of the suction cup 22 of this embodiment, and adhesiveness of the suction cup of the comparative example, having the gel layer 48 of a uniform thickness equals to the thickness of the center portion 50 will be explained.

Adhesiveness of the suction cups were evaluated by the time over which adhesion of the suction cup to the surface to be adsorbed is maintained.

Ten suction cups 22 of this embodiment and ten suction cups of the comparative example were obtained, allowed to adhere onto the same leather-like creped surface, and time elapsed before the suction cups drop from the leather-like creped surface was measured to give adsorption maintenance time T.

Experimental results are as follows.

The suction cup of this embodiment showed an adsorption maintenance time T of 60 days or longer.

The suction cup of the comparative example showed an adsorption maintenance time T of 15 to 30 days.

As is obvious from the experimental results described in the above, the suction cup 22 of this embodiment distinctively improves the adhesiveness as compared with the comparative example.

The embodiment has explained the case where the suction cup 22 was applied to the suction cup device 20 used for attaching vehicle-borne instruments, whereas the suction cup device 20 is not limited to the above-described embodiment, allowing application of various conventional structures, so that application of the suction cup 22 is not limited to attachment of the car-borne instruments, allowing application to various objects.

The present invention contains subject mater related to Japanese Patent Application No. JP2006-116359 filed in the Japanese Patent Office on Apr. 20, 2006, the entire contents of which being incorporated herein by reference.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A suction cup having an adsorption surface, comprising:
   a disk-like main suction cup unit composed of an elastically-deformable material and having an attachment surface; and
   a gel layer composed of a gel, bonded to the main suction cup unit so as to cover said attachment surface, wherein said adsorption surface is formed by a surface of said gel layer, and
   said gel layer includes a center portion composing a center of said adsorption surface and an outer circumferential portion composing an outer circumference of said adsorption surface, and said outer circumferential portion has a thickness larger than a thickness of said center portion when the suction cup is not attached to an object.

2. The suction cup as claimed in claim 1, wherein the thickness of said center portion is uniform, and the thickness of said outer circumferential portion is uniform.

3. The suction cup as claimed in claim 1, wherein said center portion and said outer circumferential portion are connected by an annular-plate-like slope extending out from an outer circumference of said center portion, and having a thickness that gradually increases towards the outer circumferential portion.

4. The suction cup as claimed in claim 3, wherein the thickness of said center portion is the same as a thickness of an inner circumferential portion of the slope, and the thickness of said outer circumferential portion is the same as a thickness of the outer circumferential portion of said slope.

5. The suction cup as claimed in claim 1, wherein said attachment surface is formed on a first surface in a thickness-wise direction of said main suction cup unit, a second surface in the thickness-wise direction of said main suction cup unit is a back surface, and a shaft of the suction cup is provided to a center of the back surface of said main suction cup unit and projects out therefrom.

6. The suction cup as claimed in claim 1, wherein said main suction cup unit is formed of an elastic synthetic resin material.

7. The suction cup as claimed in claim 1, wherein said attachment surface is formed as having a concave geometry.

8. The suction cup as claimed in claim 1, wherein said adsorption surface is formed as having a concave shape.

9. The suction cup as claimed in claim 1, further comprising:
   a frame including an annular plate coupled to an outer portion of the main suction cup unit via a cushion material positioned between the annular plate and the main suction cup unit, and the cushion material is attached to a back surface of the elastically-deformable material.

10. The suction cup as claimed in claim 9, further comprising:
    a shaft projecting out from the main suction cup unit; and
    an elastic component positioned between the shaft and the main suction cup unit to bias the frame towards the adsorption surface.

11. A suction cup, comprising: a disk-like main suction cup unit comprised of an elastically-deformable material and having an attachment surface; and a gel layer comprised of a gel, wherein a first surface of the gel layer is bonded to the main suction cup unit so as to cover the attachment surface, a second surface of the gel layer is an adsorption surface, and a thickness of an outer circumferential portion of the gel layer is larger than a thickness of a center portion of the gel layer when the suction cup is not attached to an object, wherein the gel layer includes an annular-plate-like slope extending out from an outer circumference of the center portion to an inner circumference of the outer circumferential portion, and the slope has a thickness that gradually increases towards the outer circumferential portion.

12. The suction cup as claimed in claim 11, wherein the thickness of the center portion is uniform, and the thickness of the outer circumferential portion is uniform.

13. The suction cup as claimed in claim 11, wherein the thickness of the center portion is the same as a thickness of the inner circumferential portion of the slope, and the thickness of the outer circumferential portion is the same as a thickness of the outer circumferential portion of the slope.

14. The suction cup as claimed in claim 11, wherein the attachment surface is formed on a first surface in a thicknesswise direction of the main suction cup unit, a second surface in the thickness-wise direction of the main suction cup unit is a back surface, and a shaft of the suction cup is provided to a center of the back surface of the main suction cup unit and projects out therefrom.

15. The suction cup as claimed in claim 11, wherein the main suction cup unit comprises an elastic synthetic resin material.

16. The suction cup as claimed in claim 11, wherein the attachment surface has a concave geometry.

17. The suction cup as claimed in claim 11, wherein the adsorption surface of the gel layer has a concave shape.

18. The suction cup as claimed in claim 11, further comprising:

a frame including an annular plate coupled to an outer portion of the main suction cup unit via a cushion material positioned between the annular plate and the main suction cup unit, and the cushion material is attached to a back surface of the main suction cup unit.

19. The suction cup as claimed in claim 18, further comprising:

a shaft projected out from the back surface of the main suction cup unit; and an elastic component positioned between the shaft and the main suction cup unit to bias the frame towards the adsorption surface of the gel layer.

\* \* \* \* \*